(12) United States Patent
Chaubey et al.

(10) Patent No.: US 11,032,389 B1
(45) Date of Patent: Jun. 8, 2021

(54) APPLYING APPLICATION-BASED POLICY RULES USING A PROGRAMMABLE APPLICATION CACHE

(71) Applicant: Juniper Networks, Inc., Sunnyvale, CA (US)

(72) Inventors: Rajeev Chaubey, Bangalore (IN); Ashok Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 72 days.

(21) Appl. No.: 16/053,532

(22) Filed: Aug. 2, 2018

(51) Int. Cl.
*H04L 29/08* (2006.01)
*H04L 29/06* (2006.01)
*H04L 12/747* (2013.01)

(52) U.S. Cl.
CPC ........ *H04L 67/2852* (2013.01); *H04L 45/742* (2013.01); *H04L 67/1095* (2013.01); *H04L 69/22* (2013.01)

(58) Field of Classification Search
CPC .............. H04L 67/2852; H04L 45/742; H04L 67/1095; H04L 69/22; H04L 67/02; H04L 67/10; H04L 45/306; H04L 45/38
USPC ........................................................ 709/213
See application file for complete search history.

(56) References Cited

U.S. PATENT DOCUMENTS

| | | | |
|---|---|---|---|
| 9,673,998 B2 | 6/2017 | Li et al. | |
| 2007/0226366 A1* | 9/2007 | Liou | G06Q 30/02 709/238 |
| 2008/0002599 A1* | 1/2008 | Yau | H04L 45/36 370/310 |
| 2010/0251329 A1* | 9/2010 | Wei | H04L 63/1408 726/1 |
| 2012/0016955 A1* | 1/2012 | Twitchell, Jr. | H04L 69/22 709/217 |
| 2015/0055657 A1* | 2/2015 | Zuk | H04L 45/306 370/392 |
| 2015/0188949 A1* | 7/2015 | Mahaffey | H04L 63/20 726/1 |
| 2018/0139262 A1 | 5/2018 | Li | |

OTHER PUBLICATIONS

Microsoft Computer Dictionary, Fifth Edition; p. 362 (Year: 2002).*

* cited by examiner

*Primary Examiner* — Tan Doan
(74) *Attorney, Agent, or Firm* — Harrity & Harrity, LLP

(57) ABSTRACT

A network device receives a packet from a client device, and identifies, based on receiving the packet, a destination of the packet. The network device determines, based on information included in an application cache, an application associated with the destination of the packet, where the first network device, the client device, and the application cache are included in a first local network. The network device determines, based on the information included in the application cache, a policy rule associated with the application, and applies the policy rule to the packet.

20 Claims, 15 Drawing Sheets

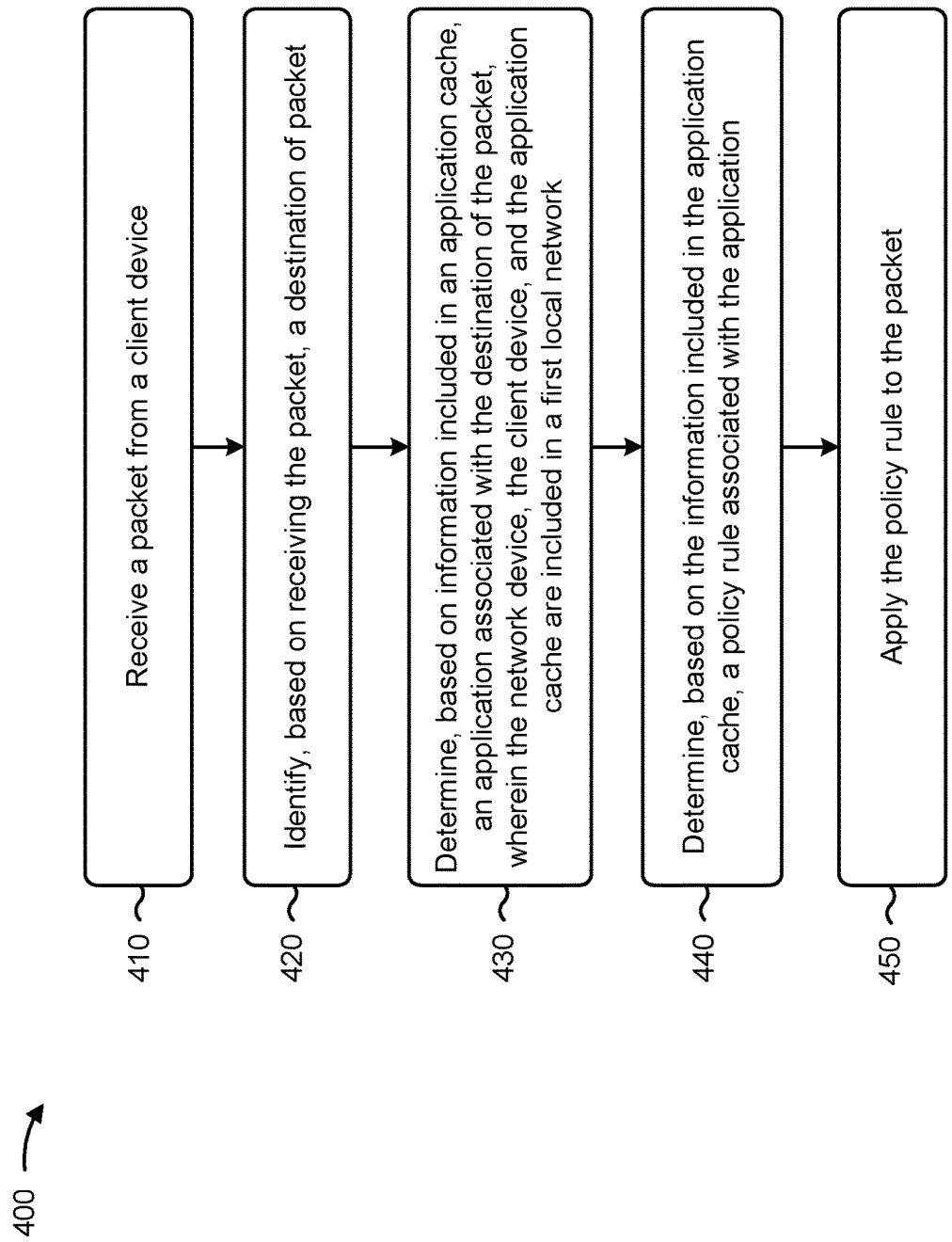

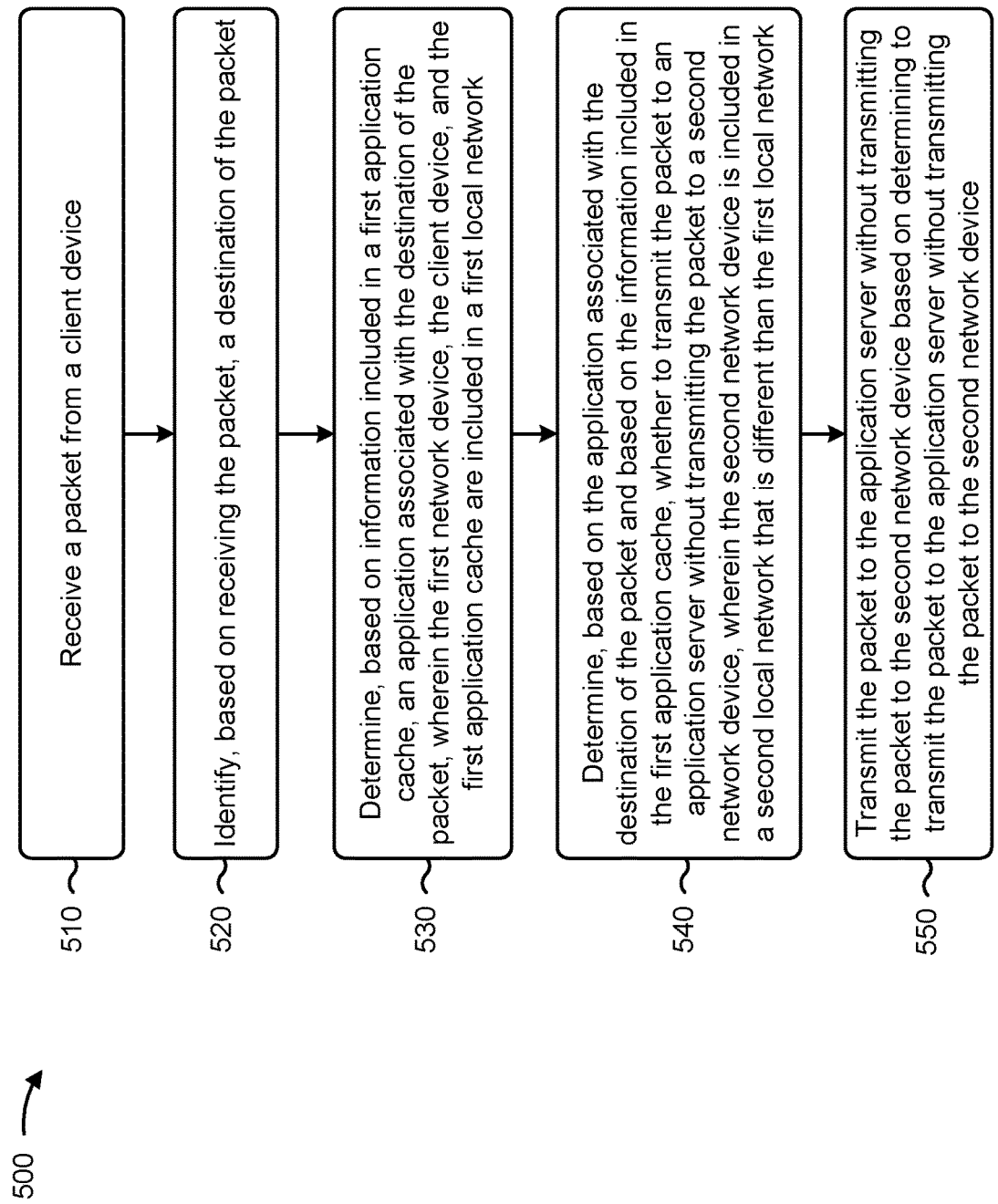

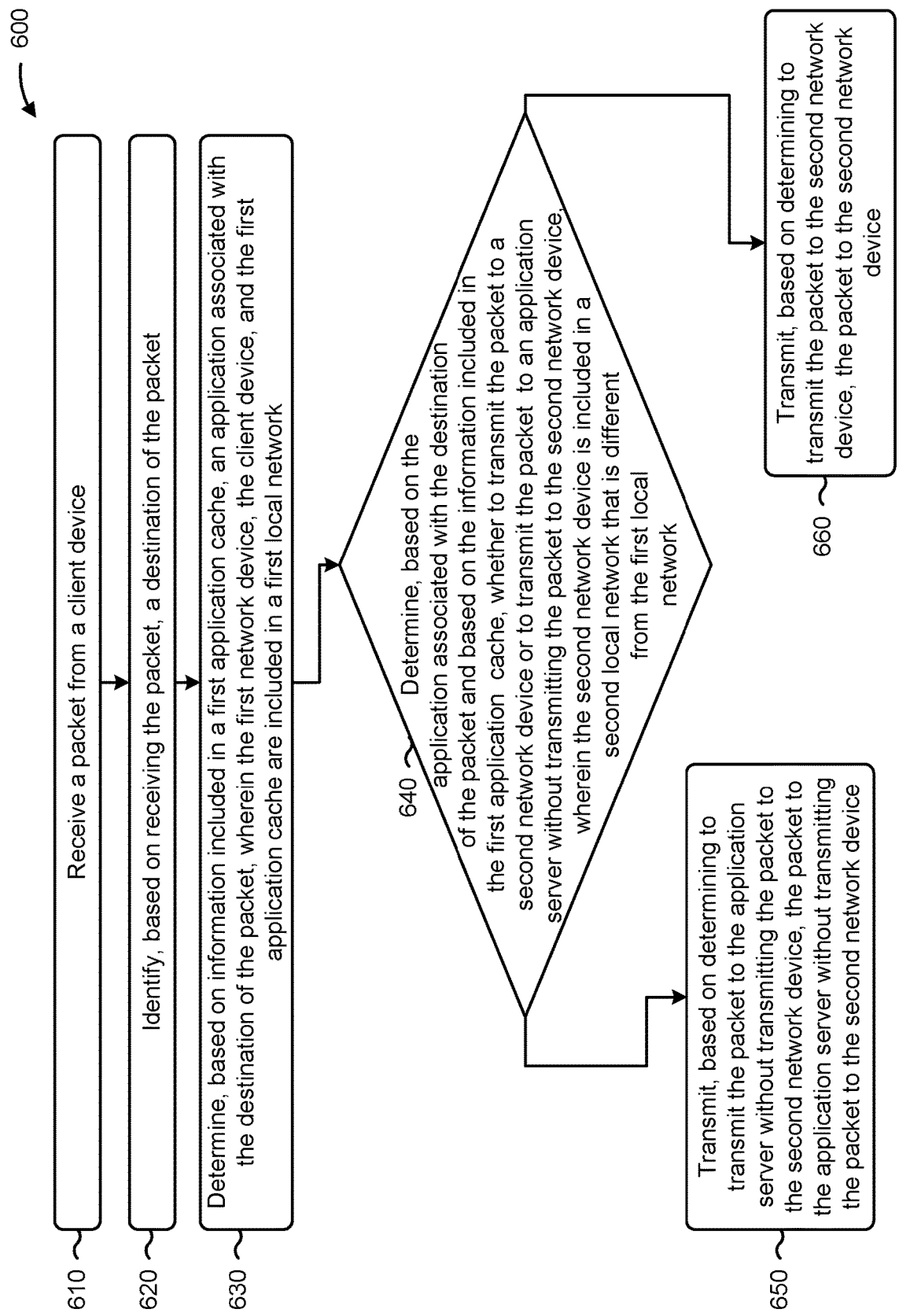

APPLYING APPLICATION-BASED POLICY RULES USING A PROGRAMMABLE APPLICATION CACHE

BACKGROUND

In some cases, an entity, such as an enterprise, an educational institution, a government agency, and/or the like, may have multiple geographic locations that each have a local network. The local networks may interconnect and exchange network packets via a network device located at each of the geographic locations.

SUMMARY

According to some implementations, a network device may include one or more memories, and one or more processors, communicatively coupled to the one or more memories, to receive a packet from a client device, and to identify, based on receiving the packet, a destination of the packet. The one or more processors may determine, based on information included in an application cache, an application associated with the destination of the packet, wherein the network device, the client device, and the application cache are included in a first local network. The one or more processors may determine, based on the information included in the application cache, a policy rule associated with the application, and may apply the policy rule to the packet.

According to some implementations, a non-transitory computer-readable medium may store instructions that include one or more instructions that, when executed by one or more processors of a device, cause the one or more processors to receive a packet from a client device, and to identify, based on receiving the packet, a destination associated with the packet. The one or more instructions may cause the one or more processors to determine, based on information included in a first application cache, an application associated with the destination of the packet, wherein the first network device, the client device, and the first application cache are included in a first local network. The one or more instructions may cause the one or more processors to determine, based on the application associated with the destination of the packet and based on the information included in the first application cache, whether to transmit the packet to an application platform without transmitting the packet to a second network device, wherein the second network device is included in a second local network that is different than the first local network. The one or more instructions may cause the one or more processors to transmit the packet to the application platform without transmitting the packet to the second network device based on determining to transmit the packet to the application platform without transmitting the packet to the second network device.

According to some implementations, a method may include receiving, at a first network device, a packet from a client device, and identifying, by the first network device and based on receiving the packet, a destination of the packet. The method may include determining, by the first network device and based on information included in a first application cache, an application associated with the destination of the packet, wherein the first network device, the client device, and the first application cache are included in a first local network. The method may include determining, by the first network device, based on the application associated with the destination of the packet and based on the information included in the first application cache, whether to transmit the packet to a second network device or to transmit the packet to an application platform without transmitting the packet to the second network device, wherein the second network device is included in a second local network that is different from the first local network. The method may include transmitting, by the first network device and based on determining to transmit the packet to the application platform without transmitting the packet to the second network device, the packet to the application platform without transmitting the packet to the second network device, or transmitting, by the first network device and based on determining to transmit the packet to the second network device, the packet to the second network device.

BRIEF DESCRIPTION OF THE DRAWINGS

FIGS. 4-6 are flow charts of example processes for applying application-based policy rules.

DETAILED DESCRIPTION

Figure 1A:
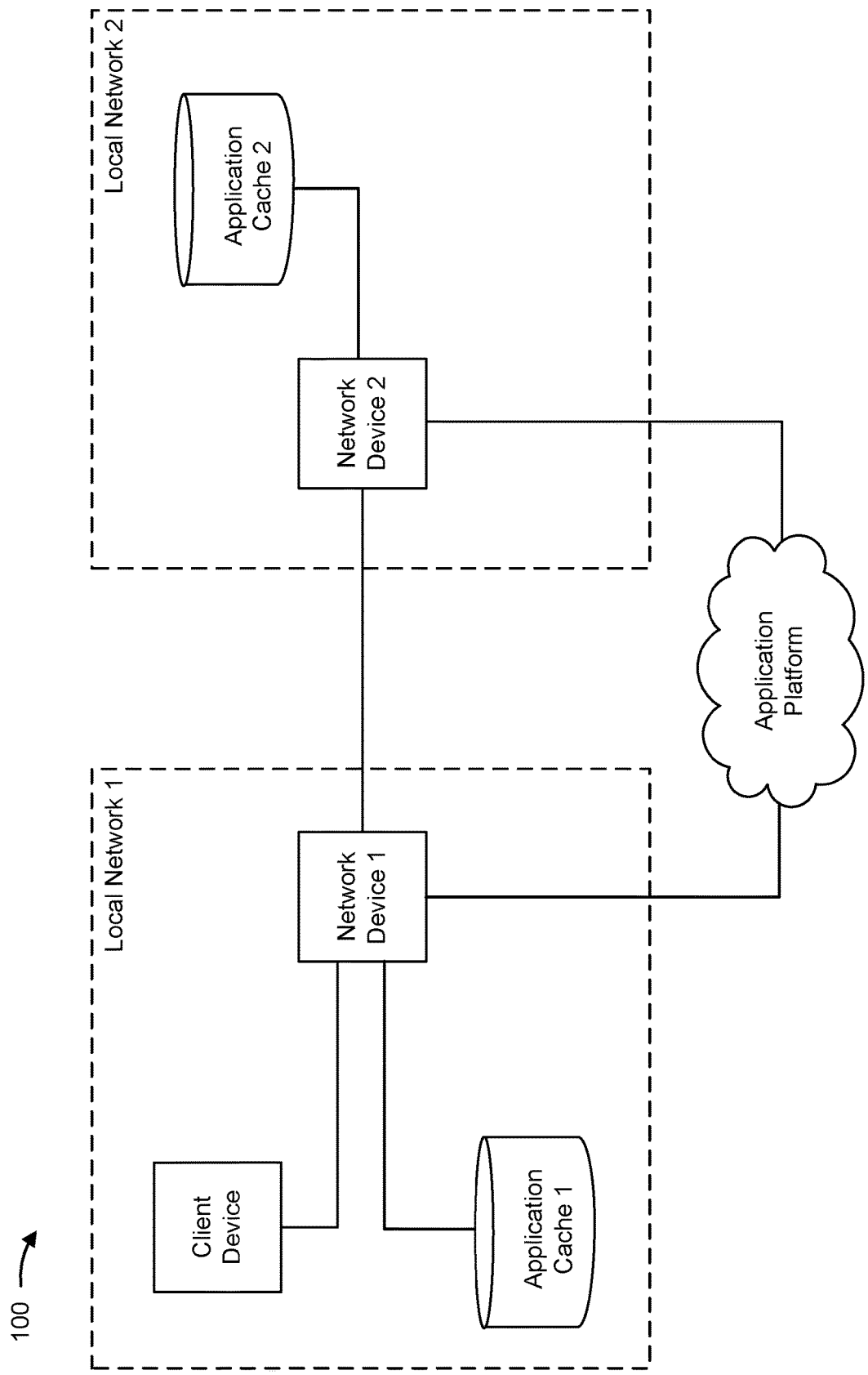
FIGS. 1A-1I are diagrams of an example implementation described herein.

The following detailed description of example implementations refers to the accompanying drawings. The same reference numbers in different drawings may identify the same or similar elements.

In some cases, a first network device included in a first local network associated with an entity may receive a packet from a client device included in the first local network, and may transmit the packet to a second network device included in a second local network associated with the entity. The second network device may receive the packet from the first network device, and may perform various actions associated with the packet, such as applying one or more policy rules to the packet, transmitting the packet to another device (e.g., an application platform, another network device included in another network, etc.), and/or the like.

In some cases, such as when the client device is communicating with an application platform, a packet, associated with the client device, may be transmitted from the first local network to the second local network prior to transmitting the packet to the application platform. For example, an enterprise may be associated with a main office or an outsourced location where policy rules are applied in a centralized way to packets that are transmitted and/or received by client devices of the enterprise. The client devices may be located at satellite or remote offices of the enterprise, which may include on the order of hundreds, thousands, etc., locations. This centralized way for applying policy rules may cause an increase in latency between the client devices and the application platform, which in turn may result in a degraded user experience, periodic disconnects between the client devices and the application platform, and/or the like. Moreover, applying policy rules at a network device in a centralized location may cause the network device to become a bottleneck for communications between the client devices and the application platform as the enterprise continues to grow, which may result in the processing queue for the network device to increase, which in turn may cause increased packet processing times, dropped packets, and/or the like.

Some implementations described herein provide a network device capable of applying application-based policy rules. In some implementations, the network device may receive a packet from a client device, may identify a destination of the packet, may determine an application associated with the destination of the packet, may determine a policy rule associated with the application, and may apply the policy rule to the packet.

In this way, the network device may apply application-based policy rules without having to inspect a payload of a packet to determine the application associated with the packet. This allows the network device to transmit the packet to an application platform (or another destination) without first transmitting the packet to another network device included in another local network, which decreases latency between the client device and the application, which in turn improves user experience associated with the client device. Moreover, transmitting the packet to the application platform without first transmitting the packet to the other network device deceases the quantity of packets transmitted between the local network and the other local network, which decreases network resource usage between the local network and the other local network and allows network resources that would have otherwise been used to transmit the packet between the local network and the other local network to be used for other purposes. Further, transmitting the packet to the application platform without first transmitting the packet to the other network device deceases the quantity of packets the other network device is to process, which reduces processing and/or memory resource usage of the other network device, reduces the time it takes to process a packet at the other network device (e.g., because the packet processing queue at the other network device is reduced), and allows the other network device to use the processing and/or memory resources that would have otherwise been used to process the packet for other purposes.

Figure 1B:
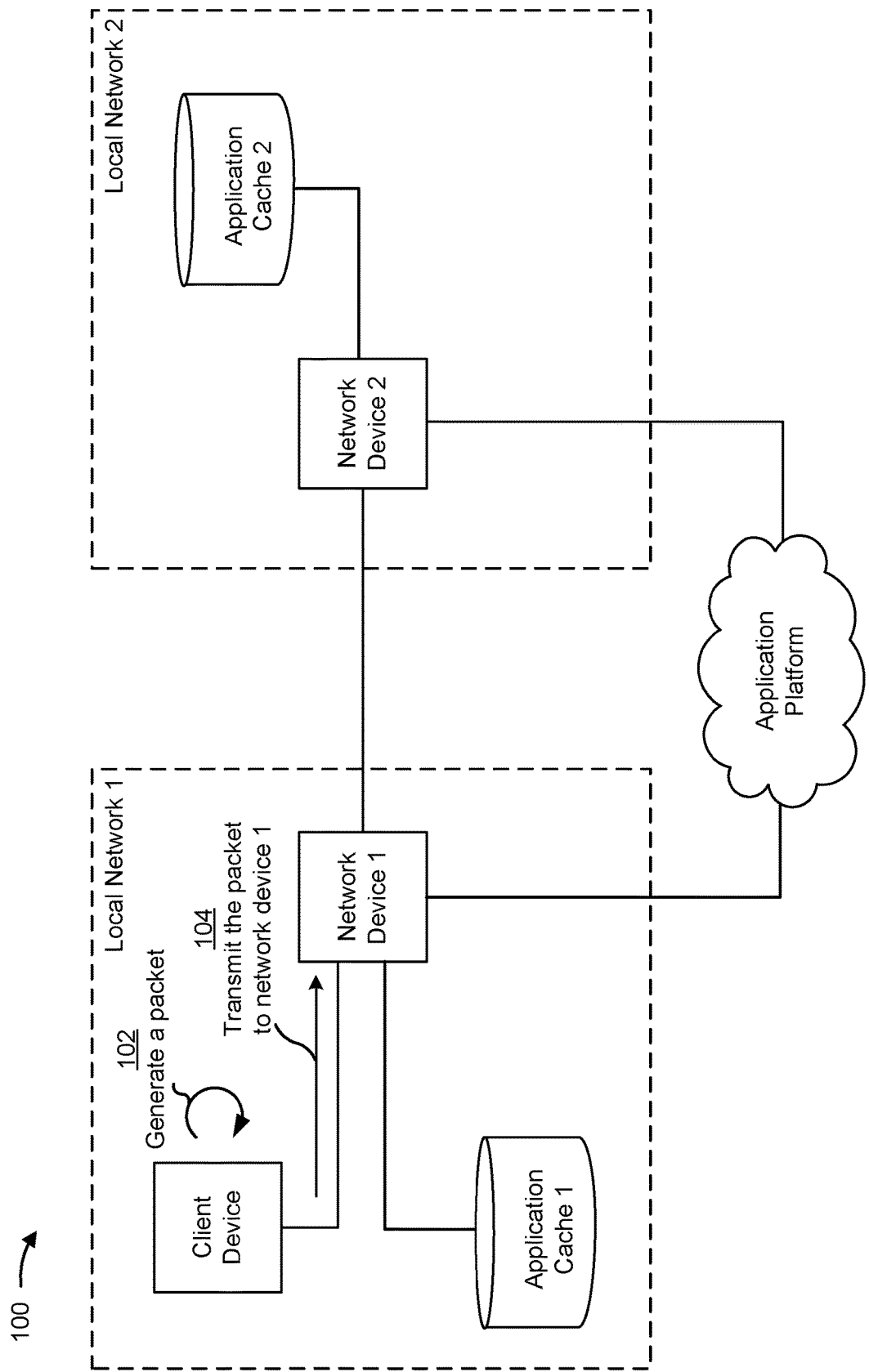

FIGS. 1A-1I are diagrams of an example implementation 100 described herein. As shown in FIG. 1A, implementation 100 may include a plurality of local networks (e.g., local network 1, local network 2, etc.), an application platform, and/or the like. While implementation 100 is illustrated in FIGS. 1A-1B as including local network 1 and local network 2, other quantities of local networks may be included in implementation 100.

Local network 1 and local network 2 may include various types of wired and/or wireless local area networks (LANs), such as a wired LAN, a wireless LAN (WLAN), a home network, an office network, a campus network, and/or the like. In some implementations, local network 1 and local network 2 may be associated with the same entity, such as an enterprise, corporation, government agency, educational institution, and/or the like. In some implementations, local network 1 and local network 2 may be associated with different offices, different locations, different networks, and/or the like, of the entity. For example, local network 1 may be located in a satellite office, a remote office, and/or the like, of the entity and local network 2 may be located in a main office, headquarters office, and/or the like of the entity.

Local network 1 and local network 2 may include various devices. In some implementations, local network 1 may include a client device (or a plurality of client devices), a network device (e.g., network device 1), an application cache (e.g., application cache 1), and/or the like; and local network 2 may include another network device (e.g., network device 2) and another application cache (e.g., application cache 2).

Network device 1 and network device 2 may include various types of network devices that are capable of transmitting packets over a connection between network device 1 and network device 2, capable of transmitting packets to the application platform, and/or the like. For example, network device 1 may receive a packet from the client device, may transmit the packet to network device 2, and network device 2 may transmit the packet to the application platform. As another example, network device 1 may receive a packet from the client device and may transmit the packet to the application platform without transmitting the packet to network device 2.

Application cache 1 and application cache 2 may store information associated with various software applications, such as a productivity application (e.g., a word processing application, a spreadsheet application, an email application etc.), a client management application, a computer-aided design application, and/or the like. The information associated with a particular application may include information identifying the application (e.g., the name of the application, the version number of the application, etc.), information identifying one or more addresses associated with the application (e.g., a source address associated with a device that originates packets associated with the application, a destination address associated with a device that is the destination of the packets associated with the application, a port identifier associated with the source and/or destination of the packets associated with the application, etc.), information identifying one or more communications protocols associated with the application (e.g., a communications protocol that the client device and/or the application platform may use to transmit and/or receive packets associated with the application), information identifying one or more policy rules associated with the application (e.g., a policy rule for routing traffic associated with the application, a policy rule for quality of service (QoS) treatment of the traffic associated with the application, a policy rule for inspection of the traffic associated with the application, a policy rule that specifies that the traffic associated with the application is to be rate limited, a policy rule that specifies that the traffic associated with the application is to be dropped, etc.), and/or the like. In some implementations, the information associated with the application, stored in application cache 1 and/or application cache 2, may include information associated with usage of the application (e.g., overall traffic volume observed for the application, a quantity of open and/or active sessions associated with the application, a time of day for peak session usage of the application, a time of day for peak users of the application, etc.), which network device 1, network device 2, and/or another device may analyze to automatically generate new application policies for the application.

Network device 1, network device 2, and/or the like may access the information associated with the various applications, stored in application cache 1 and/or application cache 2, by querying application cache 1 and/or application cache 2 via an application programming interface (API) to request a list of applications supported by application cache 1 and/or application cache 2 (e.g., a list including application identifiers, application names, application descriptions, etc.), to request a list of groups of applications supported by application cache 1 and/or application cache 2 (e.g., a list including information associated with a productivity suite of applications, information associated with a computer-aided engineering suite of applications, etc.), to request information associated with application usage, to request information associated with a particular entry (e.g., based on source address, destination address, port identifiers, application, etc.), and/or the like.

In some implementations, application cache 1 and/or application cache 2 may be updated to store information associated with new and/or additional applications. For example, application cache 1 and/or application cache 2 may be updated via input, such as data input from a user. As another example, application cache 1 and application cache 2 may synchronize such that application cache 1 and/or application cache 2 may determine whether application cache 2 stores information associated with an application that is not stored in application cache 1. Based on determining that application cache 2 is storing information associated with an application that is not stored in application cache 1, application cache 2 may transmit the information to application cache 1. For example, application cache 2 may automatically transmit the information based on determining that application cache 2 is storing information associated with an application that is not stored in application cache 1, may transmit the information based on receiving a request from application cache 1, and/or the like.

Turning to FIG. 1B, network device 1 may use application cache 1 to apply application-based policy rules to packets generated and transmitted by the client device. As shown by reference number 102, the client device may generate a packet. In some implementations, the packet may be associated with an application, such as any of the applications described above or another application. For example, the packet may include data associated with the application, such as a portion of email data, a portion of a word processing electronic file, and/or the like. In some implementations, the application may be associated with the application platform. The application may be a client-side application (e.g., an application installed or located on the client device), a cloud-based application (e.g., an application hosted on the application platform), and/or the like.

In some implementations, the client device may be instructed (e.g., by a user, by the application, etc.) to transmit the packet to the application platform. Accordingly, and as shown by reference number 104, the client device may transmit the packet to network device 1.

Figure 1C:
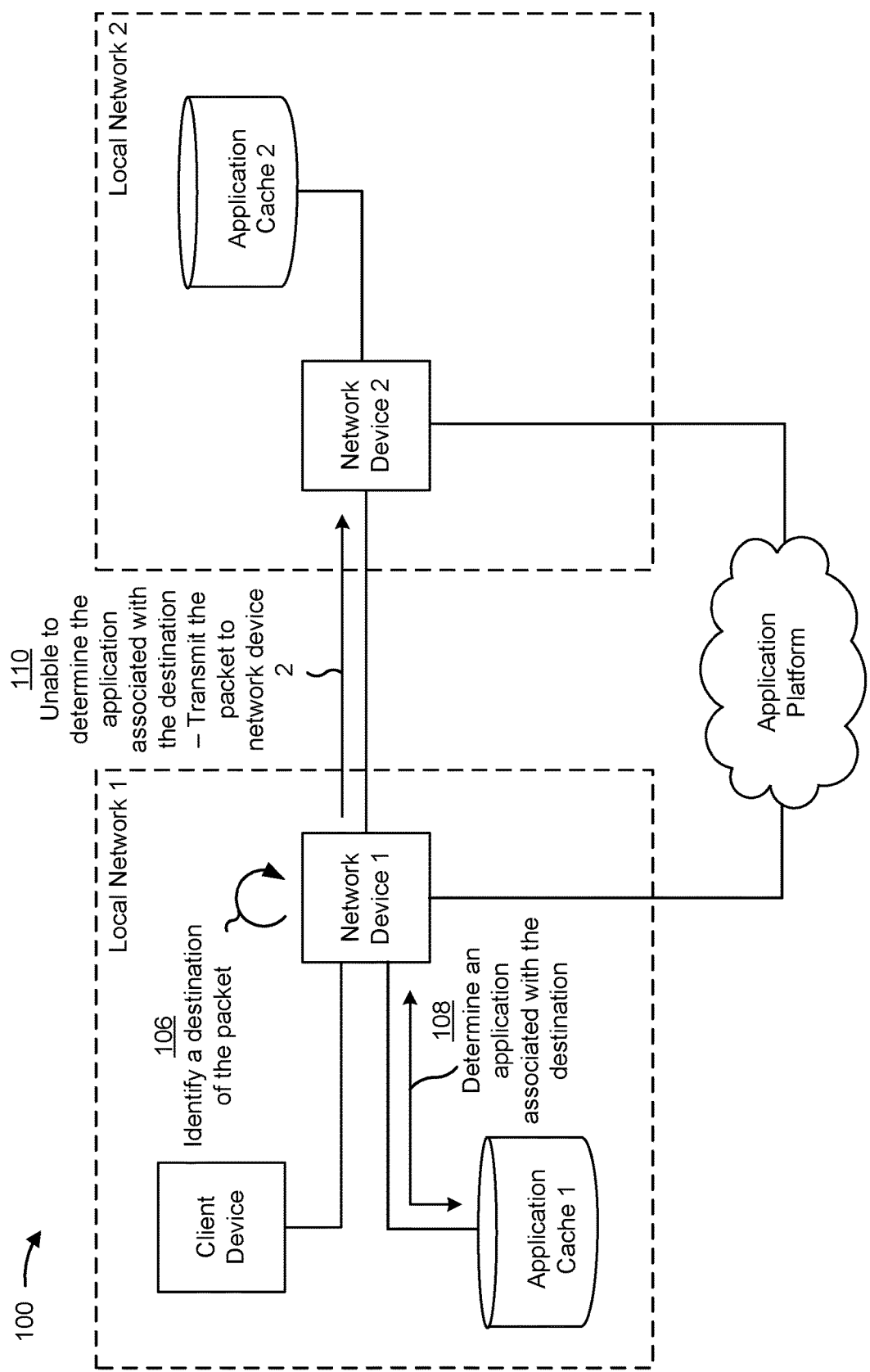

Turning to FIG. 1C, network device 1 may receive the packet from the client device. As shown by reference number 106, network device 1 may identify a destination of the packet. In some implementations, network device 1 may identify the destination of the packet by analyzing a header included in the packet to identify information, included in the header, that identifies the destination of the packet. The information identifying the destination may include information specifying an address associated with the destination of the packet, a port identifier associated with the destination of the packet, and/or the like.

As shown by reference number 108, network device 1 may attempt to determine the application associated with the destination of the packet. As explained above, application cache 1 may include information associated with various applications. Accordingly, network device 1 may attempt to determine the application associated with the destination of the packet based on the information included in application cache 1. For example, network device 1 may determine whether the information, included in application cache 1, includes information associating the destination of the packet with the application associated with the destination. The information associating the destination with the application may be included in metadata associated with the application, in a structured electronic file (e.g., an extensible markup language (XML) file, a JavaScript Object Notation (JSON) file, etc.) associated with the application, and/or the like.

In some implementations, and as shown by reference number 110, network device 1 may be unable to determine the application associated with the destination of the packet. Network device 1 may be unable to determine the application associated with the destination of the packet for various reasons, such as because application cache 1 does not include information associating the destination with an application, because the packet is not associated with an application, and/or the like. As a result of being unable to determine the application associated with the destination of the packet, network device 1 may transmit the packet to network device 2 included in local network 2. In some implementations, network device 1 may automatically transmit the packet to network device 2, upon being unable to determine the application associated with the destination of the packet, based on being configured to transmit packets for which network device 1 is unable to determine the application associated with the destination of the packet.

Figure 1D:
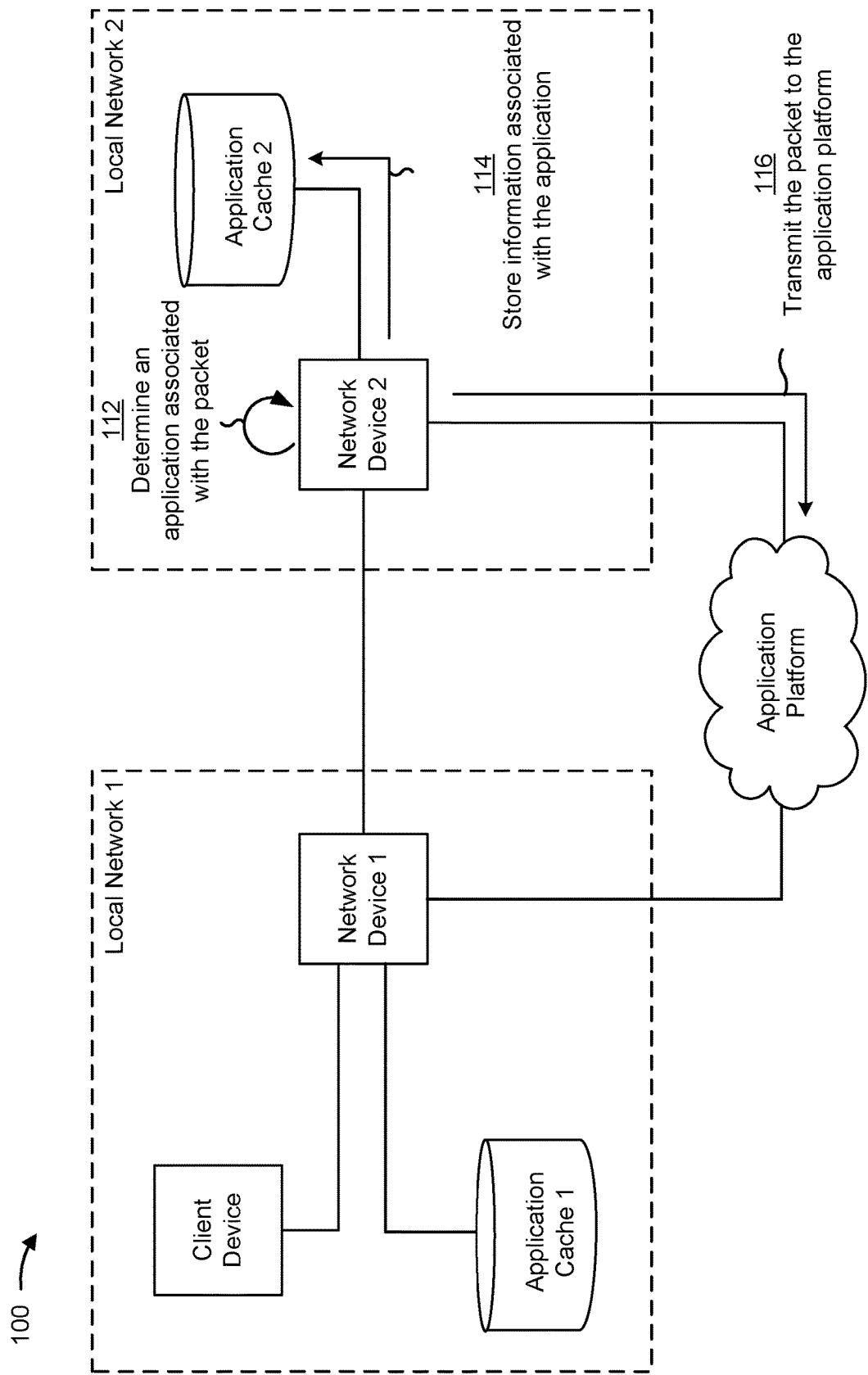

Turning to FIG. 1D, network device 2 may receive the packet from network device 1. As shown by reference number 112, network device 2 may determine the application associated with the packet. In some implementations, network device 2 may be configured to inspect a payload of the packet to determine the application associated with the packet. For example, network device 2 may be configured to perform deep packet inspection, or another type of inspection that allows network device 2 to examine the payload of the packet. Network device 2 may determine the application associated with the packet by identifying information, associated with the application, included in the payload. For example, network device 2 may identify a file type or extension associated with the application, may identify the application based on metadata included in the payload, and/or the like.

As shown by reference number 114, network device 2 may store information, associated with the application, in application cache 2. In some implementations, the information associated with the application may be stored in application cache 2 as metadata, an electronic file such as an XML file, a JSON file, and/or the like.

The information associated with the application may include information associating the destination of the packet with the application, information associating the application with a policy rule, and/or the like. The information associating the destination of the packet with the application may include information associating an address of the destination with the application (e.g., an Internet Protocol (IP) address and/or the like), information associating a protocol and where applicable related port identifier (e.g., a port number, a port name, and/or the like), and/or the like.

The policy rule may include various types of policy rules, such as a policy rule for routing traffic associated with the application (e.g., a policy rule specifying that the traffic associated with the application is to be transmitted to the application platform without transmitting the traffic to local network 2, a policy rule specifying that the traffic associated with the application is to be transmitted to local network 2, and/or the like), a policy rule for QoS of the traffic associated with the application (e.g., a policy rule specifying a QoS class of the traffic, a policy rule specifying a prioritization of the traffic, and/or the like), a policy rule for inspecting the traffic associated with the application (e.g., a policy rule specifying a frequency of inspection of the traffic, a policy rule specifying a level of inspection of the traffic, and/or the like), a policy rule that specifies that the traffic associated with the application is to be rate limited, a policy rule that specifies that the traffic associated with the application is to be dropped, and/or the like.

In some implementations, network device 2 may determine the policy rule that is to be associated with the application based on various factors, such as network device 2 being provisioned with information associating the policy rule with the application (e.g., by the entity associated with local network 1 and local network 2, by an entity responsible for operating and maintaining network device 2, and/or the like), such as the application being a particular type of application that is associated with the policy rule (e.g., such as productivity applications being associated with a policy rule that specifies traffic associated with productivity applications is to be transmitted to the application platform without transmitting the traffic to local network 2), and/or the like.

In some implementations, network device 2 may automatically generate the policy rule that is to be associated with the application. For example, network device 2 may automatically generate the policy rule based on usage information associated with the application (e.g., a quantity of users associated with the entity that use the application, traffic volume of the application in the entity, peak session and usage times associated with the application in the entity, and/or the like), latency requirements for the application, and/or the like. For example, network device 2 may determine that the application is a video conferencing application that requires low latency, and therefore may generate a policy rule for the application that specifies packets associated with the application are to be transmitted to the application platform without transmitting the packets to local network 2 in order to decrease the latency associated with the application. As another example, network device 2 may determine that the application has a particular peak usage time, and may generate a policy rule for the application that specifies packets associated with the application are to be transmitted to local network 2 prior to being transmitted to the application platform except during the peak usage time, where the packets may be transmitted to the application platform without transmitting the packets to local network 2.

As shown by reference number 116, network device 2 may transmit the packet to the platform, after determining the application associated with the packet and storing the information associated with the application in application cache 2.

Figure 1E:
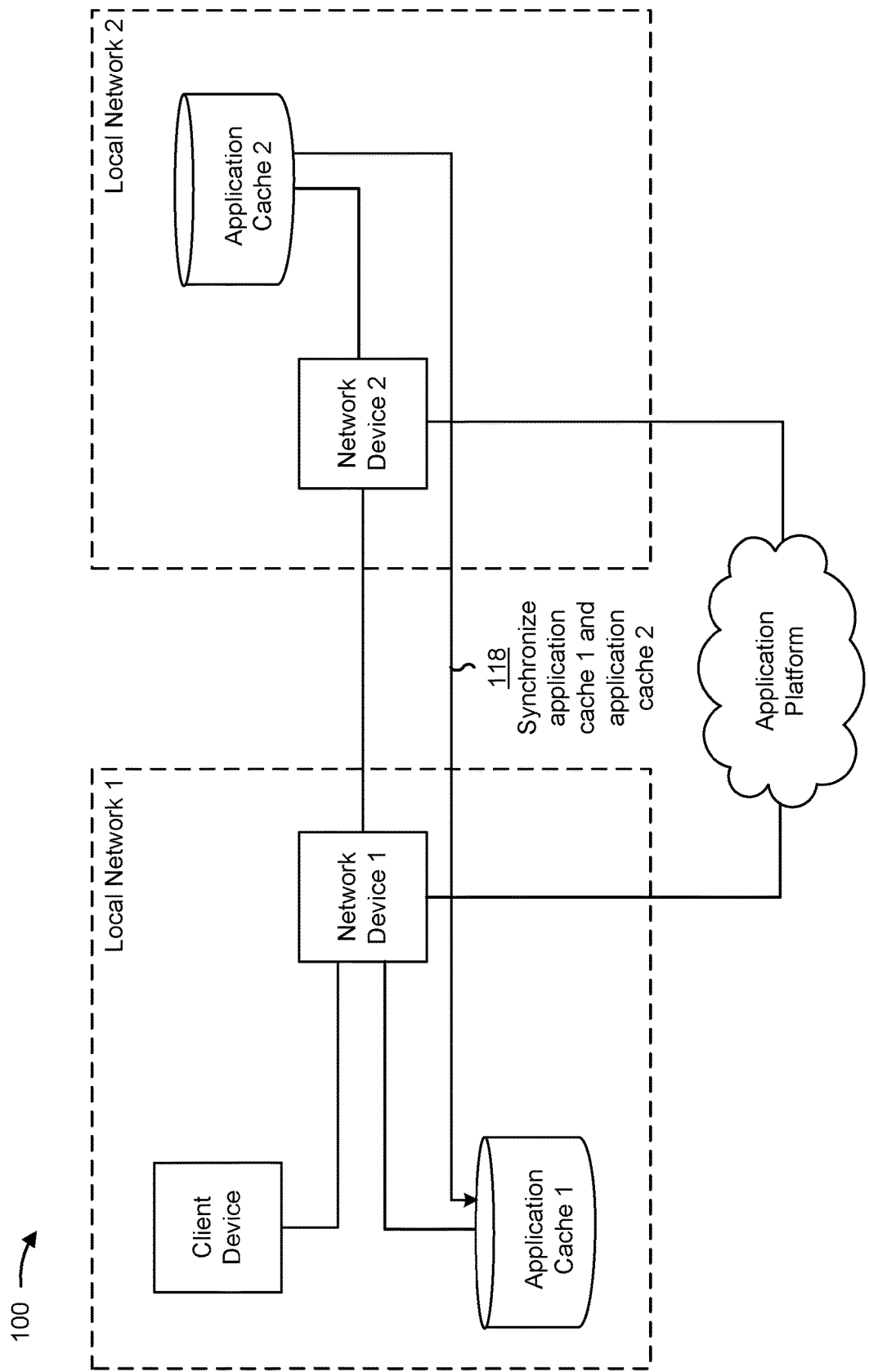

Turning now to FIG. 1E, and as shown by reference number 118, application cache 1 and application cache 2 may synchronize so that the information associated with the application, stored in application cache 2, may be stored in application cache 1 and used by network device 1 to apply application-based policy rules. Application cache 1 and application cache 2 may synchronize such that application cache 2 transmits the information associated with the application to application cache 1, and such that application cache 1 stores the information associated with the application, and/or vice-versa. In some implementations, to synchronize application cache 1 and application cache 2, network device 2 may obtain the information associated with the application from application cache 2, may transmit the information associated with the application to network device 1, and network device 1 may store the information associated with the application in application cache 1.

In some implementations, application cache 2 may transmit the information associated with the application to application cache 1 using an application programming interface (API), such as a representational state transfer (RESTful) API and/or the like, over a hypertext transfer protocol (HTTP) connection. In some implementations, application cache 2 may transmit the information associated with the application to application cache 1 via the RESTful API using HTTP commands. For example, application cache 2 may initiate a transfer of the information associated with an application to application cache 1 by using a HTTP post command and/or a HTTP put command. As another example, application cache 1 may initiate a transfer of the information associated with an application by using a HTTP get command. In some implementations, application cache 2 may remove information stored in application cache 2 by using a HTTP delete command.

In some implementations, a connection between application cache 1 and application cache 2 may be encrypted (e.g., using secure sockets layer (SSL) encryption, transport layer security (TLS) encryption, etc.) and/or authenticated prior to application cache 1 and application cache 2 being synchronized. In some implementations, application cache 1 may initiate the synchronization by transmitting information to application cache 2, that indicates that application cache 1 is available to be synchronized. The information may include a notification, a message, a packet, and/or the like, that indicates application cache 1 is available to be synchronized.

Figure 1F:
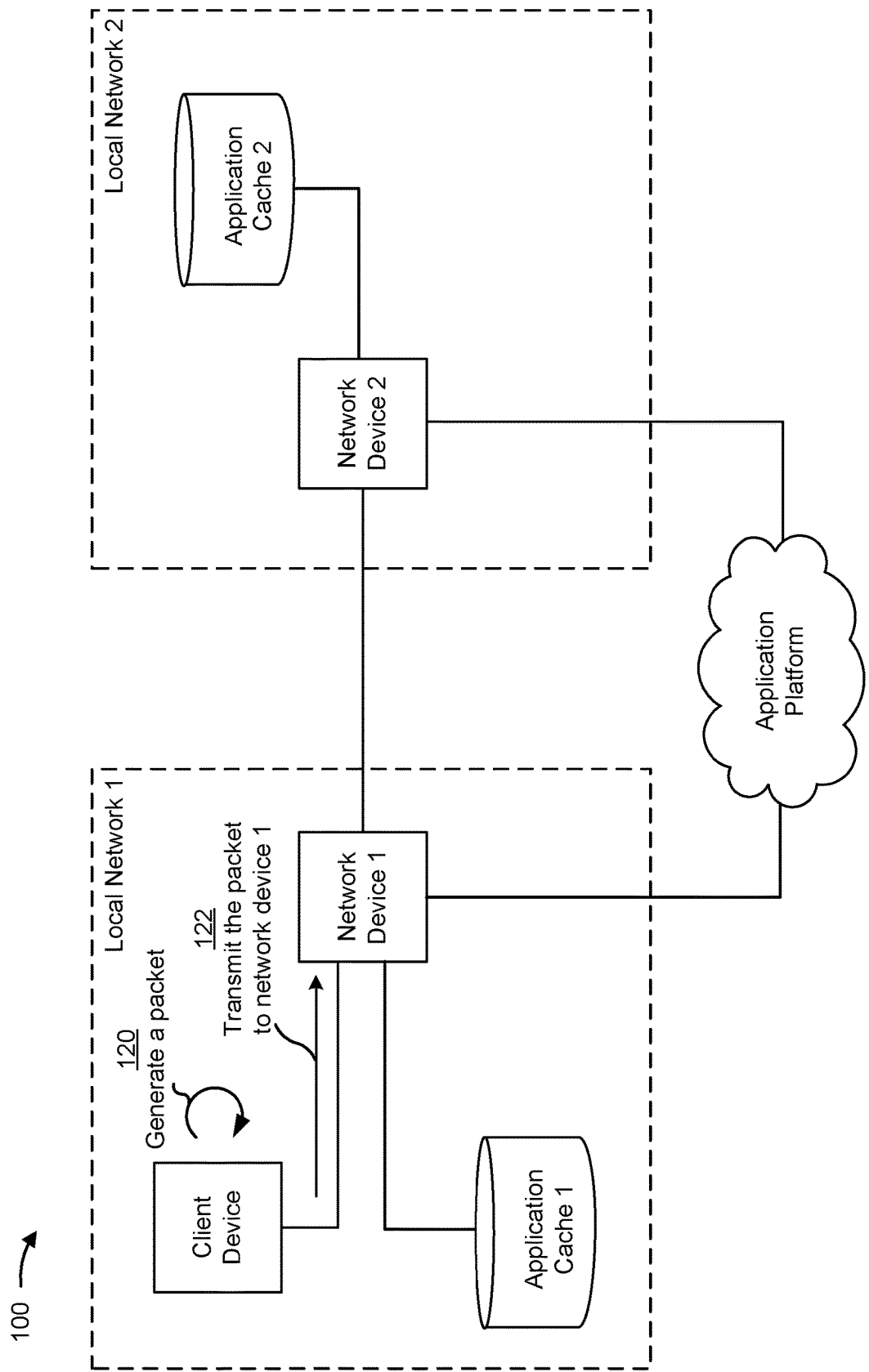

Turning to FIG. 1F, network device 1 may apply policy rules to packets associated with the application based on the information associated with the application that was synchronized between application cache 1 and application cache 2. In this way, the network device 1 may apply application-based policy rules where network device 1 may be incapable of performing deep packet inspection or another technique to inspect the payload of a packet to identify the application associated with the packet. For example, network device 1 may be incapable of performing deep packet inspection of a packet because the packet is encrypted (e.g., using SSL encryption, TLS encryption, etc.), and network device 1 is incapable of decrypting the packet. As another example, network device 1 may not have the processing and/or memory resources available to perform deep packet inspection of a packet. Accordingly, application cache 1 allows network device 1 to perform functions that network device 1 may not otherwise be capable of performing, which adds functionality to local network 1.

As shown by reference number 120, the client device may generate a packet. The packet may be associated with the application and may be destined for the application platform. As shown by reference number 122, to transmit the packet to the application platform, the client device may transmit the packet to network device 1.

Figure 1G:
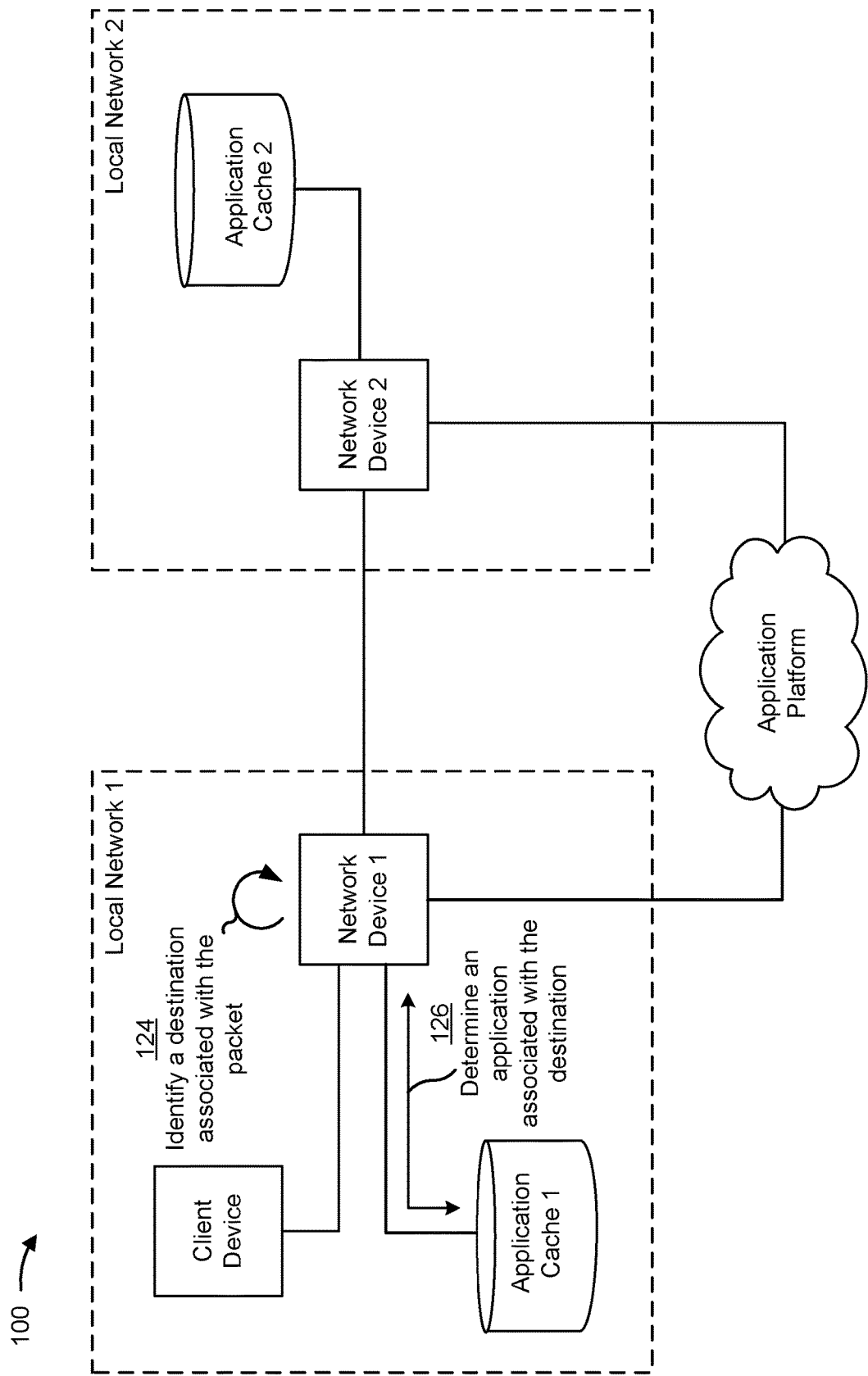

Turning to FIG. 1G, and as shown by reference number 124, network device 1 may identify the destination associated with the packet. In some implementations, network device 1 may identify the destination of the packet by analyzing a header included in the packet to identify information, included in the header, that identifies the destination of the packet. The information identifying the destination may include information specifying an address associated with the destination of the packet, a port identifier associated with the destination of the packet, and/or the like.

As shown by reference number 126, network device 1 may attempt to determine the application associated with the destination of the packet. Network device 1 may attempt to determine the application associated with the destination of the packet based on the information included in application cache 1. For example, network device 1 may determine whether the information, included in application cache 1, includes the information associating the destination of the packet with the application.

Figure 1H:
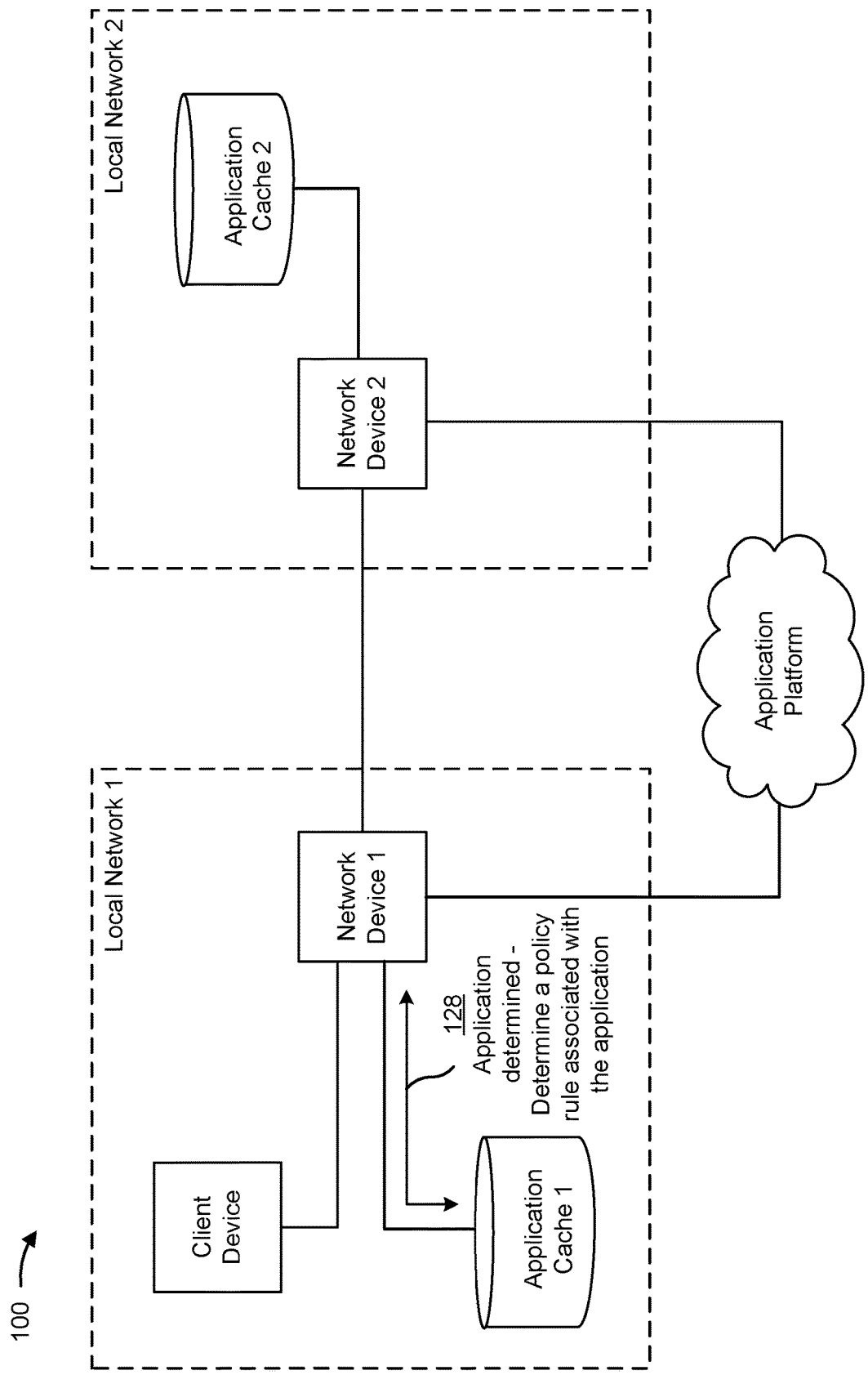

Turning to FIG. 1H, and as shown by reference number 128, network device 1 may determine that application cache 1 includes the information associated with the application, which includes the information associating the destination of the packet with the application. For example, network device 1 may determine that application cache 1 includes information associating the address, protocol and/or port of the destination with the application. Accordingly, network device 1 may determine, based on the information associated with the application, a policy rule associated with the application. For example, network device 1 may determine the policy rule based on the information, included in the information associated with the application, associating the application with the policy rule.

Figure 1I:
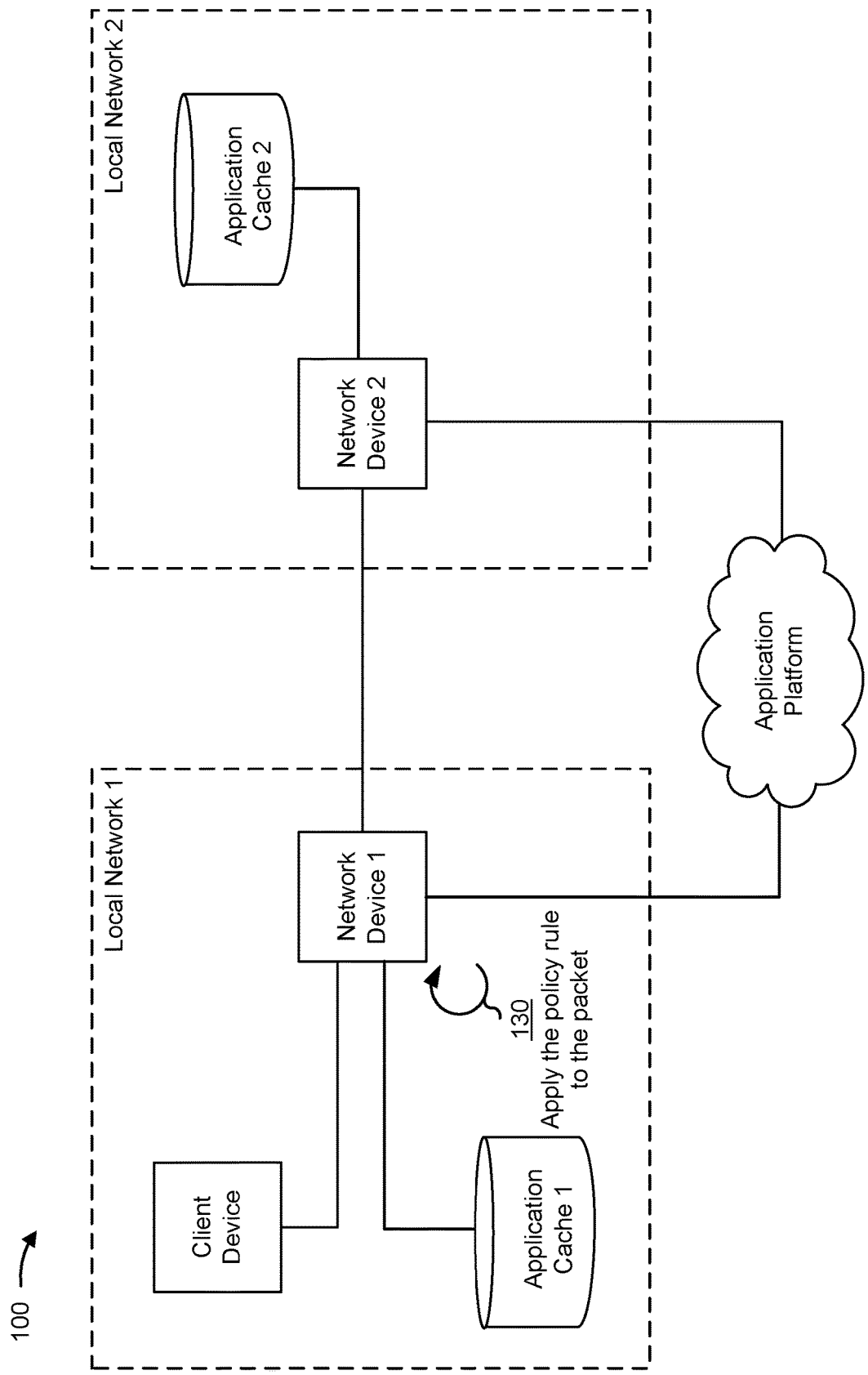

Turning to FIG. 1I, and as shown by reference number 130, network device 1 may apply the policy rule to the packet. For example, and as shown in FIG. 1I, the policy rule may specify that traffic associated with the application is to be transmitted to the destination (e.g., the application platform) without transmitting the packet to local network 2. Other examples of policy rules that may be applied to the packet are described above.

In some implementations, the application platform may receive the packet and, based on receiving the packet, may store the packet, may transmit the packet to another location, may modify the packet, may transmit one or more packets to the client device, may analyze the packet, and/or the like.

In this way, network device 1 may apply application-based policy rules without having to inspect a payload of a packet to determine the application associated with the packet. This allows network device 1 to transmit the packet to an application platform (or another destination) without first transmitting the packet to network device 2 included in local network 2, which decreases latency between the client device and the application, which in turn improves user experience associated with the client device. Moreover, transmitting the packet to the application platform without first transmitting the packet to network device 2 deceases the quantity of packets transmitted between local network 1 and local network 2, which decreases network resource usage between local network 1 and local network 2 and allows network resources that would have otherwise been used to transmit the packet between local network 1 and local network 2 to be used for other purposes. Further, transmitting the packet to the application platform without first transmitting the packet to network device 2 deceases the quantity of packets network device 2 is to process, which reduces processing and/or memory resource usage of network device 2, reduces the time it takes to process a packet at network device 2 (e.g., because the packet processing queue at network device 2 is reduced), and allows network device 2 to use the processing and/or memory resources that would have otherwise been used to process the packet for other purposes.

As indicated above, FIGS. 1A-1I are provided merely as an example. Other examples are possible and may differ from what was described with regard to FIGS. 1A-1I.

Figure 2:
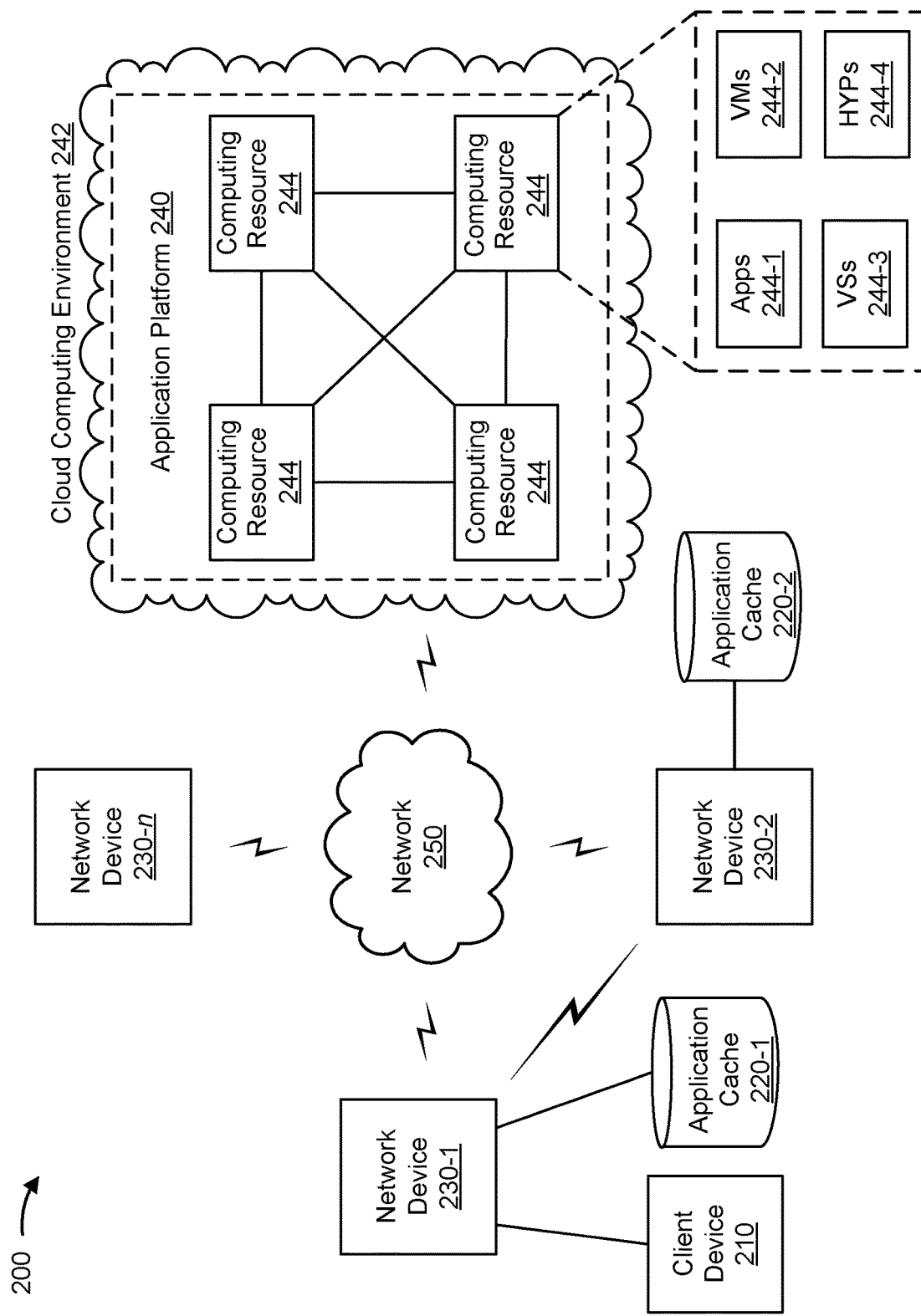
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a plurality of application caches 220 (e.g., application cache 220-1 and application cache 220-2, collectively referred to as "application caches 220" and individually as "application cache 220"), a plurality of network devices (e.g., network device 230-1 through network device 230-n, collectively referred to as "network devices 230" and individually as "network device 230"), an application platform 240 in a cloud computing environment 242 that includes a set of computing resources 244, a network 250, and/or the like. Devices of environment 200 may interconnect via wired connections, wireless connections, or a combination of wired and wireless connections.

Client device 210 includes one or more devices capable of receiving, generating, storing, processing, and/or providing data associated with applying application-based policy rules. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. Client device 210 may generate a packet (e.g., a packet associated with an application), may transmit a packet to network device 230 (e.g., based on being instructed to transmit an application to application platform 240), and/or the like.

Application cache 220 includes one or more devices capable of receiving, generating, storing, processing, and/or providing data associated with applying application-based policy rules. For example, application cache 220 may include a storage device, a memory device, and/or the like that stores information associated with one or more applications, such as information identifying the application, information associating the application with a destination, information associating the application with one or more policy rules, and/or the like. In some implementations, application cache 220-1 and/or application cache 220-2 may be standalone devices, may be included in a network device (e.g., network device 230-1, network device 230-2, etc.) or another device, and/or the like. In some implementations, application cache 220-1 and application cache 220-2 may synchronize by exchanging information associated with one or more applications. For example, application cache 220-2 may transmit information associated with a new application to application cache 220-1, may transmit updated information associated with an application to application cache 220-1, and/or the like.

Network device 230 includes one or more devices capable of receiving, generating, storing, processing, and/or providing data associated with applying application-based policy rules. In some implementations, network device 230 may include a firewall, a router, a gateway, a switch, a bridge, a wireless access point, a base station (e.g., eNodeB, NodeB, gNodeB, and/or the like), and/or the like. In some implementations, network device 230 may be implemented as a physical device implemented within a housing, such as a chassis. In some implementations, network device 230 may be implemented as a virtual device implemented by one or more computer devices of a cloud computing environment or a data center.

In some implementations, network device 230 may receive a packet from client device 210, and may identify a destination of the packet. In some implementations, network device 230 may attempt to determine an application associated with a destination of a packet (e.g., based on information included in application cache 220). In some implementations, network device 230 may, based on being unable to determine an application associated with a destination of the packet, transmit the packet to another network device 230, which may receive the packet, determine an application associated with the packet, store information associated with the application in another application cache 220, and transmit the packet to application platform 240.

Application platform 240 includes one or more devices capable of receiving, generating, storing, processing, and/or providing data associated with applying application-based policy rules. For example, application platform 240 may include a server device (e.g., a host server, a web server, an application server, etc.), a data center device, or a similar device. Application platform 240 may receive a packet from network device 230, may store the packet, may transmit the packet to another location, may modify the packet, may transmit one or more packets to the client device, may analyze the packet, and/or the like. In some implementations, application platform 240 may be associated with an application, and may receive the application, traffic associated with the application, a packet associated with the application, and/or the like.

In some implementations, as shown, application platform 240 may be hosted in cloud computing environment 242. Notably, while implementations described herein describe application platform 240 as being hosted in cloud computing environment 242, in some implementations, application platform 240 may not be cloud-based (i.e., may be implemented outside of a cloud computing environment) or may be partially cloud-based.

Cloud computing environment 242 includes an environment that hosts application platform 240. Cloud computing environment 242 may provide computation, software, data access, storage, and/or other services. As shown, cloud computing environment 242 may include a group of computing resources 244 (referred to collectively as "computing resources 244" and individually as "computing resource 244").

Computing resource 244 includes one or more personal computers, workstation computers, server devices, or another type of computation and/or communication device. In some implementations, computing resource 244 may host application platform 240. The cloud resources may include compute instances executing in computing resource 244, storage devices provided in computing resource 244, data transfer devices provided by computing resource 244, etc. In some implementations, computing resource 244 may communicate with other computing resources 244 via wired connections, wireless connections, or a combination of wired and wireless connections.

As further shown in FIG. 2, computing resource 244 may include a group of cloud resources, such as one or more applications ("APPs") 244-1, one or more virtual machines ("VMs") 244-2, one or more virtualized storages ("VSs") 244-3, or one or more hypervisors ("HYPs") 244-4.

Application 244-1 includes one or more software applications that may be provided to or accessed by one or more devices of environment 200. Application 244-1 may eliminate a need to install and execute the software applications on devices of environment 200. For example, application 244-1 may include software associated with application platform 240 and/or any other software capable of being provided via cloud computing environment 242. In some implementations, one application 244-1 may send/receive information to/from one or more other applications 244-1, via virtual machine 244-2. In some implementations, application 244-1 may include a software application associated with one or more databases and/or operating systems. For example, application 244-1 may include an enterprise application, a functional application, an analytics application, and/or the like.

Virtual machine 244-2 includes a software implementation of a machine (e.g., a computer) that executes programs like a physical machine. Virtual machine 244-2 may be either a system virtual machine or a process virtual machine, depending upon use and degree of correspondence to any real machine by virtual machine 244-2. A system virtual machine may provide a complete system platform that supports execution of a complete operating system ("OS"). A process virtual machine may execute a single program, and may support a single process. In some implementations, virtual machine 244-2 may execute on behalf of a user (e.g., a user of client device 210 and/or an operator of application platform 240), and may manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 244-4 provides hardware virtualization techniques that allow multiple operating systems (e.g., "guest operating systems") to execute concurrently on a host computer, such as computing resource 244. Hypervisor 244-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
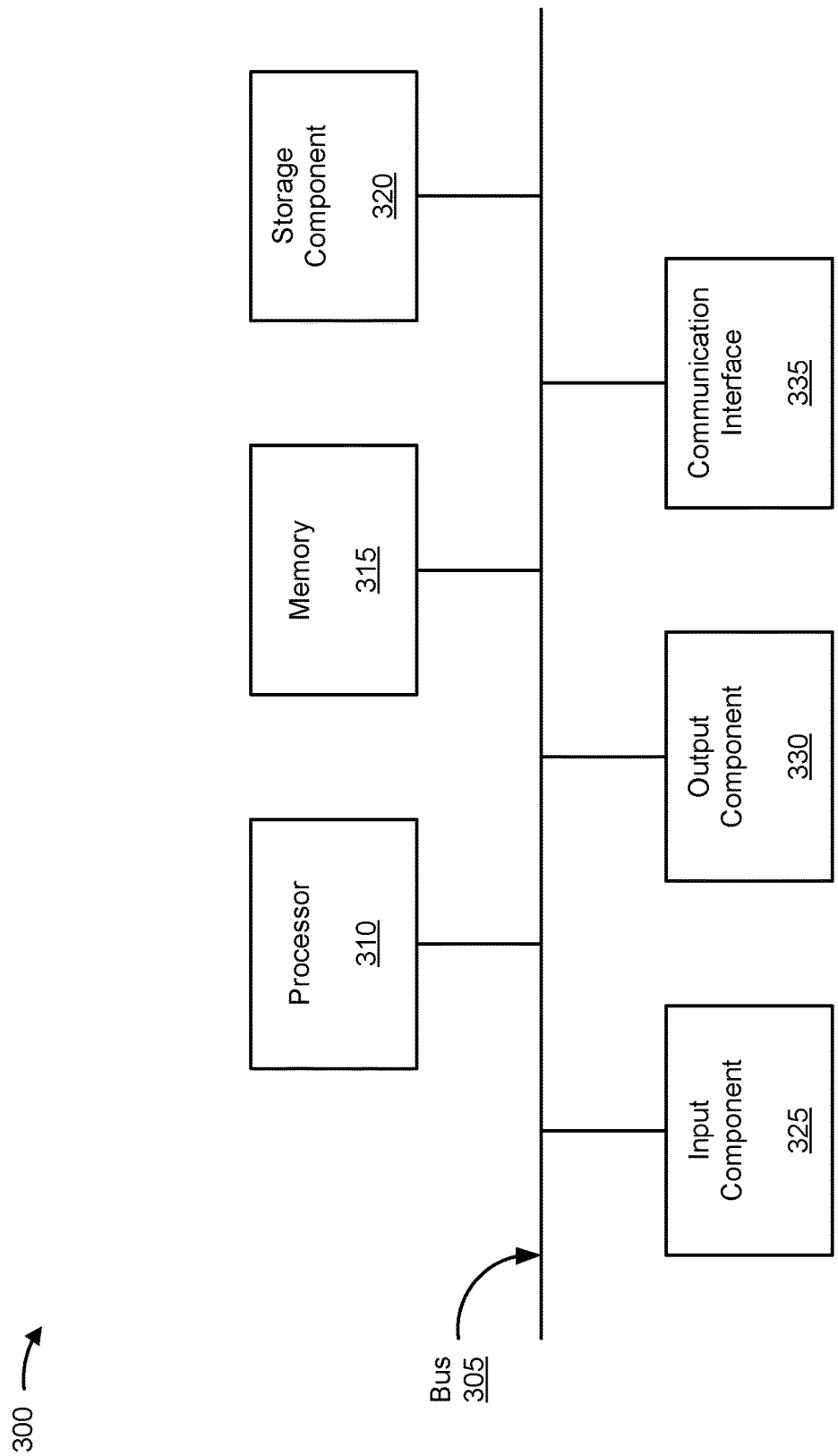
FIGS. 3A and 3B are diagrams of example components of one or more devices of FIG. 2.
Figure 3B:
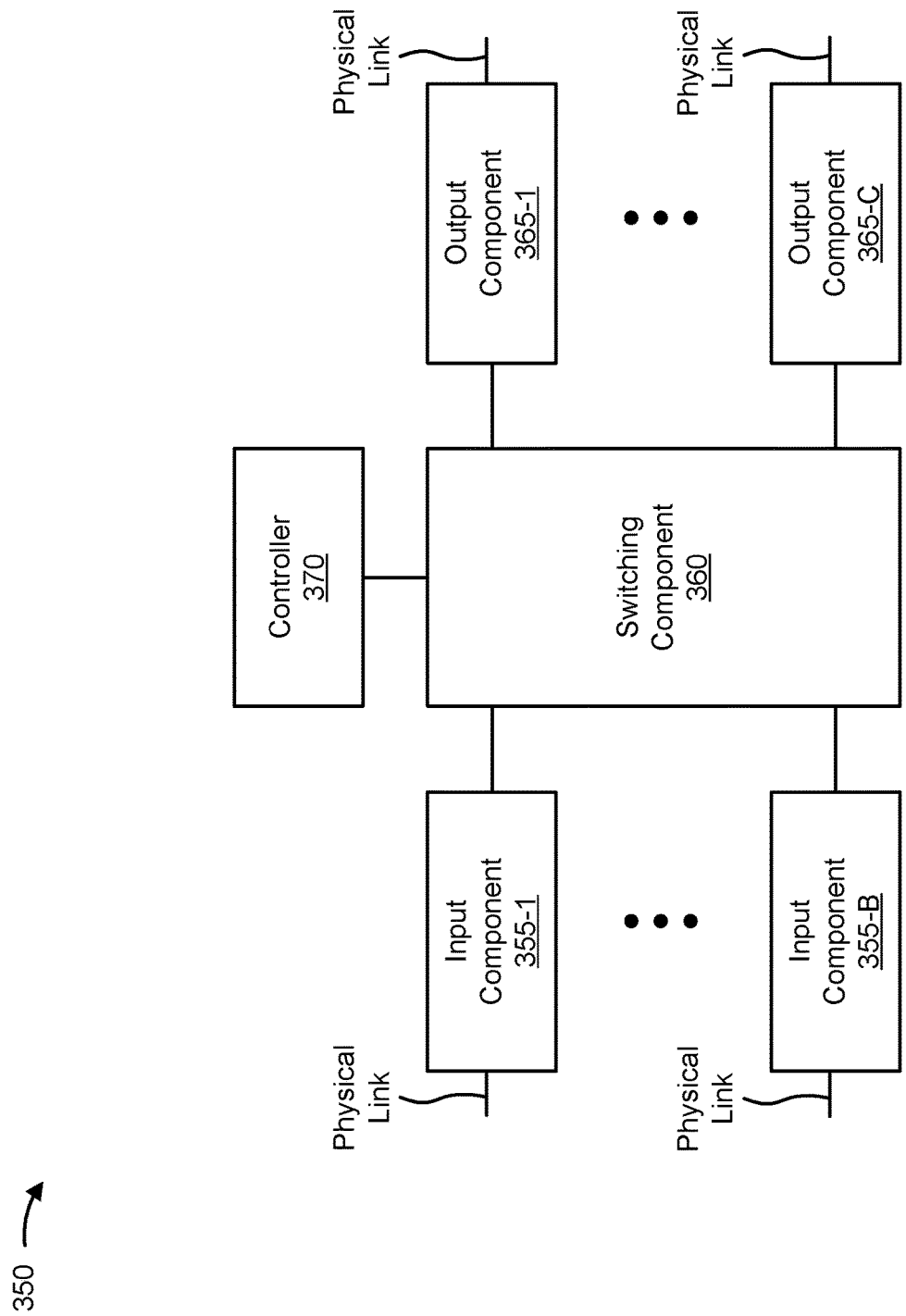

FIGS. 3A and 3B are diagrams of example components of one or more devices of FIG. 2. FIG. 3A is a diagram of example components of a device 300. Device 300 may correspond to client device 210, application cache 220, network device 230, application platform 240, and/or the like. In some implementations, client device 210, application cache 220, network device 230, application platform 240, and/or the like, may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 230. In some implementations, network device 230 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flow chart of an example process 400 for applying application-based policy rules. In some implementations, one or more process blocks of FIG. 4 may be performed by a network device (e.g., network device 230). In some implementations, one or more process blocks of FIG. 4 may be performed by another device or a group of devices separate from or including the network device, such as client device 210, application cache 220, another network device 230, application platform 240, and/or computing resource 244.

As shown in FIG. 4, process 400 may include receiving a packet from a client device (block 410). For example, the network device (e.g., using processor 310, communication interface 335, input component 355, controller 370, and/or the like) may receive a packet from a client device, as described above in connection with FIGS. 1A-1I.

As further shown in FIG. 4, process 400 may include identifying, based on receiving the packet, a destination of the packet (block 420). For example, the network device (e.g., using processor 310, memory 315, controller 370, and/or the like) may identify, based on receiving the packet, a destination of the packet, as described above in connection with FIGS. 1A-1I.

As further shown in FIG. 4, process 400 may include determining, based on information included in an application cache, an application associated with the destination of the packet, wherein the network device, the client device, and the application cache are included in a first local network (block 430). For example, the network device (e.g., using processor 310, storage component 320, communication interface 335, input component 355, output component 365, controller 370, and/or the like) may determine, based on information included in an application cache, an application associated with the destination of the packet, as described above in connection with FIGS. 1A-1I. In some implementations, the network device, the client device, and the application cache may be included in a first local network.

As further shown in FIG. 4, process 400 may include determining, based on the information included in the application cache, a policy rule associated with the application (block 440). For example, the network device (e.g., using processor 310, memory 315, controller 370, and/or the like) may determine, based on the information included in the application cache, a policy rule associated with the application, as described above in connection with FIGS. 1A-1I.

As further shown in FIG. 4, process 400 may include applying the policy rule to the packet (block 450). For example, the network device (e.g., using processor 310, output component 330, communication interface 335, output component 365, controller 370, and/or the like) may apply the policy rule to the packet, as described above in connection with FIGS. 1A-1I.

Process 400 may include additional implementations, such as any single implementation or any combination of implementations described below and/or described with regard to any other process described herein.

In some implementations, the information included in the application cache may include information associating the destination of the packet with the application. In some implementations, the network device may receive, from a second local network, different than the first local network, and prior to receiving the packet from the client device, the information associating the destination with the application, and may store, in the application cache, the information associating the destination with the application.

In some implementations, the policy rule associated with the application may include a policy rule that specifies that traffic associated with the application is to be transmitted to an application server, associated with the application, without being transmitted to a second network device included in a second local network different than the first local network, a policy rule for quality of service (QoS) treatment of the traffic associated with the application, a policy rule for inspection of the traffic associated with the application, a policy rule that specifies that the traffic associated with the application is to be rate limited, or a policy rule that specifies that the traffic associated with the application is to be dropped.

In some implementations, the first local network and the second local network may be associated with a same entity. In some implementations, when applying the policy rule to the packet, the first network device may transmit the packet to the application server without transmitting the packet to the second network device included in the second local network. In some implementations, the information included in the first application cache may be populated in the first application cache by a centralized software-defined networking (SDN) controller using an application programming interface (API).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for applying application-based policy rules. In some implementations, one or more process blocks of FIG. 5 may be performed by a first network device (e.g., network device 230). In some implementations, one or more process blocks of FIG. 5 may be performed by another device or a group of devices separate from or including the first network device, such as client device 210, application cache 220, another network device 230, application platform 240, and/or computing resource 244.

As shown in FIG. 5, process 500 may include receiving a packet from a client device (block 510). For example, the first network device (e.g., using processor 310, input component 325, communication interface 335, input component 355, controller 370, and/or the like) may receive a packet from a client device, as described above in connection with FIGS. 1A-1I.

As further shown in FIG. 5, process 500 may include identifying, based on receiving the packet, a destination associated with the packet (block 520). For example, the first network device (e.g., using processor 310, memory 315, controller 370, and/or the like) may identify, based on receiving the packet, a destination associated with the packet, as described above in connection with FIGS. 1A-1I.

As further shown in FIG. 5, process 500 may include determining, based on information included in a first application cache, an application associated with the destination of the packet, wherein the first network device, the client device, and the first application cache are included in a first local network (block 530). For example, the first network device (e.g., using processor 310, memory 315, communication interface 335, input component 355, controller 370, and/or the like) may determine, based on information included in a first application cache, an application associated with the destination of the packet, as described above in connection with FIGS. 1A-1I. In some implementations, the first network device, the client device, and the first application cache may be included in a first local network.

As further shown in FIG. 5, process 500 may include determining, based on the application associated with the destination of the packet and based on the information included in the first application cache, whether to transmit the packet to an application server without transmitting the packet to a second network device, wherein the second network device is included in a second local network that is different than the first local network (block 540). For example, the first network device (e.g., using processor 310, memory 315, controller 370, and/or the like) may determine, based on the application associated with the destination of the packet and based on the information included in the first application cache, whether to transmit the packet to an application server without transmitting the packet to a second network device, as described above in connection with FIGS. 1A-1I. In some implementations, the second network device may be included in a second local network that is different than the first local network.

As further shown in FIG. 5, process 500 may include transmitting the packet to the application server without transmitting the packet to the second network device based on determining to transmit the packet to the application server without transmitting the packet to the second network device (block 550). For example, the first network device (e.g., using processor 310, output component 330, communication interface 335, output component 365, controller 370, and/or the like) may transmit the packet to the application server without transmitting the packet to the second network device based on determining to transmit the packet to the application server without transmitting the packet to the second network device, as described above in connection with FIGS. 1A-1I.

Process 500 may include additional implementations, such as any single implementation or any combination of implementations described below and/or described with regard to any other process described herein.

In some implementations, the first application cache may be synchronized with a second application cache included in the second local network. In some implementations, a connection between the first application cache and the second application cache may be encrypted based on secure sockets layer (SSL) encryption, and/or based on transport layer security (TLS) encryption. In some implementations, a connection between the first application cache and the second application cache may be authenticated prior to the first application cache being synchronized with the second application cache.

In some implementations, the first application cache may initiate synchronization with the second application cache by transmitting, to the second application cache, information indicating that the first application cache is available for synchronization. In some implementations, the information included in the first application cache may be populated in the first application cache by a centralized software-defined networking (SDN) controller using an application programming interface (API). In some implementations, the first local network and the second local network may be associated with a same entity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for applying application-based policy rules. In some implementations, one or more process blocks of FIG. 6 may be performed by a first network device (e.g., network device 230). In some implementations, one or more process blocks of FIG. 6 may be performed by another device or a group of devices separate from or including the first network device, such as client device 210, application cache 220, another network device 230, application platform 240, and/or computing resource 244.

As shown in FIG. 6, process 600 may include receiving a packet from a client device (block 610). For example, the first network device (e.g., using processor 310, input component 325, communication interface 335, input component 355, controller 370, and/or the like) may receive a packet from a client device, as described above in connection with FIGS. 1A-1I.

As further shown in FIG. 6, process 600 may include identifying, based on receiving the packet, a destination of the packet (block 620). For example, the first network device (e.g., using processor 310, memory 315, controller 370, and/or the like) may identify, based on receiving the packet, a destination of the packet, as described above in connection with FIGS. 1A-11.

As further shown in FIG. 6, process 600 may include determining, based on information included in a first application cache, an application associated with the destination of the packet, wherein the first network device, the client device, and the first application cache are included in a first local network (block 630). For example, the first network device (e.g., using processor 310, storage component 320, controller 370, and/or the like) may determine, based on information included in a first application cache, an application associated with the destination of the packet, as described above in connection with FIGS. 1A-1I. In some implementations, the first network device, the client device, and the first application cache may be included in a first local network.

As further shown in FIG. 6, process 600 may include determining, based on the application associated with the destination of the packet and based on the information included in the first application cache, whether to transmit the packet to a second network device or to transmit the packet to an application server without transmitting the packet to the second network device, wherein the second network device is included in a second local network that is different from the first local network (block 640). For example, the first network device (e.g., using processor 310, memory 315, controller 370, and/or the like) may determine, based on the application associated with the destination of the packet and based on the information included in the first application cache, whether to transmit the packet to a second network device or to transmit the packet to an application server without transmitting the packet to the second network device, as described above in connection with FIGS. 1A-1I. In some implementations, the second network device may be included in a second local network that is different from the first local network.

As further shown in FIG. 6, process 600 may include transmitting, based on determining to transmit the packet to the application server without transmitting the packet to the second network device, the packet to the application server without transmitting the packet to the second network device (block 650). For example, the first network device (e.g., using processor 310, output component 330, communication interface 335, output component 365, controller 370, and/or the like) may transmit, based on determining to transmit the packet to the application server without transmitting the packet to the second network device, the packet to the application server without transmitting the packet to the second network device, as described above in connection with FIGS. 1A-1I.

As further shown in FIG. 6, process 600 may include transmitting, based on determining to transmit the packet to the second network device, the packet to the second network device (block 660). For example, the first network device (e.g., using processor 310, output component 330, communication interface 335, output component 365, controller 370, and/or the like) may transmit, based on determining to transmit the packet to the second network device, the packet to the second network device, as described above in connection with FIGS. 1A-11.

Process 600 may include additional implementations, such as any single implementation or any combination of implementations described below and/or described with regard to any other process described herein.

In some implementations, the packet may be encrypted based on at least one of secure sockets layer (SSL) encryption, or transport layer security (TLS) encryption. In some implementations, the first application cache may be synchronized with a second application cache using a representational state transfer (RESTful) application programming interface (API), and the second application cache is at least one of included in the second local network, or associated with a different vendor than the first application cache. In some implementations, wherein the information included in the first application cache is populated in the first application cache by a centralized software-defined networking (SDN) controller using an application programming interface (API).

In some implementations, when determining whether to transmit the packet to the second network device or to transmit the packet to the application server without transmitting the packet to the second network device, the first network device may determine to transmit the packet to the application server without transmitting the packet to the second network device based information, included in the first application cache, associating the application with a policy rule that specifies that traffic associated with the application is to be transmitted to the application server without transmitting the packet to the second network device.

In some implementations, when determining whether to transmit the packet to the second network device or to transmit the packet to the application server without transmitting the packet to the second network device, the first network device may determine to transmit the packet to the second network device based on determining that the information included in the first application cache does not include information associating the destination with the application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a network device 230 capable of applying application-based policy rules. In some implementations, the network device 230 may receive a packet from a client device 210, may identify a destination of the packet, may determine an application associated with the destination of the packet, may determine a policy rule for routing the traffic associated with the application, and may transmit the packet based on the policy rule.

In this way, a network device 230 included in a first local network associated with an entity may apply application-based policy rules even when the network device 230 may be incapable of performing deep packet inspection or other techniques to inspect the payload of a packet to identify the application associated with the packet, which increases the functionality of the network device 230 without increasing the processing and/or memory capabilities of the network device. For example, the network device 230 may transmit a packet associated with a particular application such that the packet is transmitted to a destination without first transmitting the packet to another network device 230 included in a second local network associated with the entity, which decreases latency between a client device 210 that generated the packet and the destination, which in turn improves user experience associated with the client device 210. Moreover, transmitting the packet to the destination without first transmitting the packet to the other network device 230 included in the second local network deceases the quantity of packets transmitted between the first local network and the second local network, which decreases network resource usage between the first local network and the second local network and allows network resources that would have otherwise been used to transmit the packet between the first local network and the second local network to be used for other purposes. Further, transmitting the packet to the destination without first transmitting the packet to the other network device 230 included in the second local network deceases the quantity of packets the other network device is to process, which reduces processing and/or memory resource usage of the other network device 230, reduces the time it takes to process a packet at the other network device 230 (e.g., because the packet processing queue at the other network device 230 is reduced), and allows the other network device to use the processing and/or memory resources that would have otherwise been used to process the packet for other purposes.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   synchronizing, by a first network device associated with a first local network, information in a first application cache associated with the first local network with information in a second application cache associated with a second local network,
      wherein the first local network is different from the second local network;
   receiving, at the first network device and after synchronizing the information in the first application cache with the information in the second application cache, a packet from a client device;
   identifying, by the first network device and based on receiving the packet, a destination of the packet;
   determining, by the first network device and based on the information in the first application cache, that an application is associated with the destination,
      wherein the first network device and the client device are included in the first local network;
   determining, by the first network device, based on the application and based on the information in the first application cache, whether to transmit the packet to a second network device or to transmit the packet to an application server without transmitting the packet to the second network device,
      wherein the application server is associated with the application, and
      wherein the second network device is included in the second local network; and
   transmitting, by the first network device and based on determining to transmit the packet to the application server without transmitting the packet to the second network device, the packet to the application server without transmitting the packet to the second network device, or
   transmitting, by the first network device and based on determining to transmit the packet to the second network device, the packet to the second network device.

2. The method of claim 1, wherein the packet is encrypted based on at least one of:
   secure sockets layer (SSL) encryption, or
   transport layer security (TLS) encryption.

3. The method of claim 1, wherein the information in the first application cache is synchronized with the information in the second application cache using a representational state transfer (RESTful) application programming interface (API).

4. The method of claim 1, wherein the information in the first application cache includes information that is populated in the first application cache by a centralized software-defined networking (SDN) controller using an application programming interface (API).

5. The method of claim 1, wherein determining whether to transmit the packet to the second network device or to transmit the packet to the application server without transmitting the packet to the second network device comprises:
  determining to transmit the packet to the application server without transmitting the packet to the second network device based on the information in the first application cache, associating the application with a policy rule that specifies that traffic associated with the application is to be transmitted to the application server without transmitting the packet to the second network device.

6. The method of claim 1, wherein determining whether to transmit the packet to the second network device or to transmit the packet to the application server without transmitting the packet to the second network device comprises:
  determining to transmit the packet to the second network device based on determining that the information in the first application cache does not include information associating the destination with the application.

7. A network device associated with a first local network, the network device comprising:
  one or more memories; and
  one or more processors to:
    synchronize information in a first application cache associated with the first local network with information in a second application cache associated with a second local network,
      wherein the first local network is different from the second local network;
    receive, after synchronizing the information in the first application cache with the information in the second application cache, a packet from a client device;
    identify, based on receiving the packet, a destination of the packet;
    determine, based on the information in the first application cache, that the application is associated with the destination,
      wherein the network device and the client device are included in the first local network;
    determine, based on the information in the first application cache, a policy rule for associating with the application;
    apply the policy rule to the packet,
      wherein the policy rule specifies that traffic associated with the application is to be transmitted to an application server associated with the application without being transmitted to another network device included in the second local network; and
    transmit, based on applying the policy rule, the packet to the application server without transmitting the packet to the other network device.

8. The network device of claim 7, wherein the policy rule further comprises at least one of:
  a policy rule for quality of service (QoS) treatment of the traffic associated with the application,
  a policy rule for inspection of the traffic associated with the application,
  a policy rule that specifies that the traffic associated with the application is to be rate limited, or
  a policy rule that specifies that the traffic associated with the application is to be dropped.

9. The network device of claim 8, wherein the first local network and the second local network are associated with a same entity.

10. The network device of claim 7, wherein the information in the first application cache includes information that is populated in the first application cache by a centralized software-defined networking (SDN) controller using an application programming interface (API).

11. The network device of claim 7, wherein the information in the first application cache includes data associated with usage of the application, the data including one or more of:
  information associated with traffic volume observed for the application,
  a quantity of open or active sessions associated with the application,
  a time of day for peak session usage of the application, or
  a time of day for peak users of the application.

12. The network device of claim 7, wherein the one or more processors, when determining that the application is associated with the destination, are to:
  determine that the information in the first application cache includes information associating the application with at least one of:
    an address of the destination, or
    a port identifier of the destination.

13. The network device of claim 7, wherein a connection between the first application cache and the second application cache is authenticated prior to the first application cache being synchronized with the second application cache.

14. A non-transitory computer-readable medium storing instructions, the instructions comprising:
  one or more instructions that, when executed by one or more processors of a first network device associated with a first local network, cause the one or more processors to:
    synchronize information in a first application cache associated with a first local network with information in a second application cache associated with a second local network,
      wherein the first local network is different from the second local network;
    receive, after synchronizing the information in the first application cache with the information in the second application cache, a packet from a client device;
    identify, based on receiving the packet, a destination of the packet;
    determine, based on the information in the first application cache, that an application is associated with the destination,
      wherein the first network device and the client device are included in the first local network;
    determine, based on the application and based on the information in the first application cache, whether to transmit the packet to an application server without transmitting the packet to a second network device,
      wherein the application server is associated with the application, and
      wherein the second network device is included in the second local network; and
    transmit the packet to the application server without transmitting the packet to the second network device based on determining to transmit the packet to the application server without transmitting the packet to the second network device.

15. The non-transitory computer-readable medium of claim 14, wherein a connection between the first application cache and the second application cache is encrypted based at least on:
- secure sockets layer (SSL) encryption, or
- transport layer security (TLS) encryption.

16. The non-transitory computer-readable medium of claim 14, wherein a connection between the first application cache and the second application cache is authenticated prior to the first application cache being synchronized with the second application cache.

17. The non-transitory computer-readable medium of claim 14, wherein the first application cache initiates synchronization with the second application cache by transmitting, to the second application cache, information indicating that the first application cache is available for synchronization.

18. The non-transitory computer-readable medium of claim 14, wherein the information in the first application cache includes information that is populated in the first application cache by a centralized software-defined networking (SDN) controller using an application programming interface (API).

19. The non-transitory computer-readable medium of claim 14, wherein the first local network and the second local network are associated with a same entity.

20. The non-transitory computer-readable medium of claim 14, wherein the one or more instructions, that cause the one or more processors to determine that the application is associated with the destination, cause the one or more processors to:
- determine that the information in the first application cache includes information associating the application with at least one of:
  - an address of the destination, or
  - a port identifier of the destination.

* * * * *